(12) United States Patent
Bill et al.

(10) Patent No.: US 12,269,304 B2
(45) Date of Patent: Apr. 8, 2025

(54) DETERMINING A STATUS OF A TYRE MONITORING DEVICE

(71) Applicants: AIRBUS OPERATIONS LIMITED, Bristol (GB); MEGGITT SA, Villars-sur-Glâne (CH)

(72) Inventors: Andrew Bill, Bristol (GB); Alessandro Fichera, Villars-sur-Glane (CH); Kevin Stanley-Adams, Villars-sur-Glâne (CH)

(73) Assignees: AIRBUS OPERATIONS LIMITED, Bristol (GB); MEGGITT SA, Villars-sur-Glane (CH)

( * ) Notice: Subject to any disclaimer, the term of this patent is extended or adjusted under 35 U.S.C. 154(b) by 0 days.

(21) Appl. No.: 17/551,283

(22) Filed: Dec. 15, 2021

(65) Prior Publication Data
US 2022/0185041 A1  Jun. 16, 2022

(30) Foreign Application Priority Data

Dec. 15, 2020 (GB) ..................... 2019794

(51) Int. Cl.
*B60C 23/04* (2006.01)
*G05B 23/02* (2006.01)

(52) U.S. Cl.
CPC ...... *B60C 23/0481* (2013.01); *B60C 23/0454* (2013.01); *B60C 23/0479* (2013.01); *G05B 23/0283* (2013.01); *B60C 2200/02* (2013.01)

(58) Field of Classification Search
CPC ......... B60C 23/00; B60C 23/02; B60C 23/04; B60C 23/0408; B60C 23/0479; B60C 23/0481; B60C 23/0486; B60C 23/0454; B60C 23/0476; B60C 2200/02; B60C 2200/04; B60C 2200/06; B60C 2200/065; B60C 2200/08; B60C 2200/10; B60C 2200/12; B60C 2200/14; G05B 23/00; G05B 23/02; G05B 23/0205; G05B 23/0283; G05B 23/0289; G05B 23/0297
See application file for complete search history.

(56) References Cited

U.S. PATENT DOCUMENTS 5,717,376 A   2/1998  Wilson
6,580,364 B1  6/2003  Munch et al.
6,945,103 B1  9/2005  Lee et al.
(Continued)

FOREIGN PATENT DOCUMENTS

CN  102162761 A  8/2011
CN  107719033 A  2/2018
(Continued)

OTHER PUBLICATIONS

European Search Report cited in 21213730.1 mailed Jun. 15, 2022, 8 pages.
(Continued)

*Primary Examiner* — Son T Le
*Assistant Examiner* — Matthew W. Baca
(74) *Attorney, Agent, or Firm* — Nixon & Vanderhye P.C.

(57) ABSTRACT

A method of determining a status of a tyre monitoring device that includes a power supply. The method includes determining a value indicative of consumption of the power supply, determining a status of the tyre monitoring device based on the value indicative of consumption of the power supply, and providing an indication based on the determined status.

20 Claims, 7 Drawing Sheets

(56) References Cited

U.S. PATENT DOCUMENTS

| | | | |
|---|---|---|---|
| 10,989,978 B1* | 4/2021 | Tsen | G06F 3/04886 |
| 2003/0131657 A1 | 7/2003 | Anderson et al. | |
| 2008/0284577 A1* | 11/2008 | Juzswik | B60C 23/0408 |
| | | | 340/447 |
| 2009/0119066 A1* | 5/2009 | Strong | G05B 23/0283 |
| | | | 399/24 |
| 2011/0202229 A1 | 8/2011 | Owens et al. | |
| 2012/0200408 A1 | 8/2012 | Gotschlich et al. | |
| 2015/0128691 A1 | 5/2015 | Keller et al. | |
| 2016/0016445 A1 | 1/2016 | Peine et al. | |
| 2019/0184772 A1* | 6/2019 | Bill | B60C 23/0422 |
| 2020/0290410 A1 | 9/2020 | Davenport | |
| 2021/0216126 A1* | 7/2021 | Dearman | G06F 1/26 |
| 2022/0088979 A1 | 3/2022 | Bill | |

FOREIGN PATENT DOCUMENTS

| | | | | |
|---|---|---|---|---|
| CN | 207408123 U | | 5/2018 | |
| DE | 10 2015 223 968 A1 | | 6/2017 | |
| DE | 102016222304 | | 5/2018 | |
| DE | 102016222304 A1 | * | 5/2018 | ......... B60C 23/0474 |
| EP | 1 092 569 | | 4/2001 | |
| EP | 1 388 439 | | 2/2004 | |
| EP | 2 749 437 | | 7/2014 | |
| EP | 2910393 | | 8/2015 | |
| EP | 3643541 | | 10/2019 | |
| GB | 201908642.0 | * | 7/2019 | ......... B60C 23/0474 |
| GB | 2584852 | | 12/2020 | |
| GB | 2584853 | | 12/2020 | |
| KR | 10-2013-0013982 | | 2/2013 | |
| KR | 20130013982 | * | 2/2013 | ............. B60C 23/04 |
| KR | 101363058 | | 2/2014 | |
| WO | 2020/254277 | | 12/2020 | |
| WO | 2020/254282 | | 12/2020 | |

OTHER PUBLICATIONS

U.S. Appl. No. 17/418,283 Office Action (Apr. 20, 2023)(21 pages).
Chinese Office Action with English Machine Translation for Application No. CN202080006964.0, 16 pages, dated Nov. 3, 2023.
Second Examination Opinion Notice for Chinese Application No. 202080006964.0, 16 pages, dated Apr. 28, 2024.

* cited by examiner

DETERMINING A STATUS OF A TYRE MONITORING DEVICE

RELATED APPLICATION

This application claims priority and incorporates by reference United Kingdom patent application GB 2019794.3 filed Dec. 15, 2020.

TECHNICAL FIELD

The present disclosure relates to a tyre monitoring system and methods of its operation. In examples, the present disclosure relates to an aircraft tyre monitoring system, such as an aircraft tyre pressure monitoring system.

BACKGROUND

Checking tyre pressure is an important part of the maintenance of a vehicle. Tyre pressures should be maintained at predetermined pressures to ensure that a tyre performs as intended by the manufacturer. Incorrect tyre pressure can lead to a tyre failing, perhaps bursting and causing damage to the vehicle and/or a loss of control. Due to the high speeds encountered by the tyres on aircraft landing gear, pressures are checked regularly, perhaps once a day or more frequently. Manual checking of tyre pressure takes time, reducing this time is beneficial.

It has been proposed to automate tyre pressure measurement by included a sensing device in a wheel which can then be interrogated wirelessly to provide a measurement of tyre pressure. This can reduce the time required compared to a manual reading, but can still take time due to a requirement to travel from wheel to wheel measuring the pressures.

It would be desirable to provide a tyre pressure measurement system which addresses some, or all, of these points.

SUMMARY

According to a first aspect of the invention there is provided a method of determining a status of a tyre monitoring device comprising a power supply, the method comprising: determining a value indicative of consumption of the power supply; determining a status of the tyre monitoring device based on the value indicative of consumption of the power supply; and providing an indication based on the determined status.

Optionally, the status of the tyre monitoring device is an estimated remaining service lifetime of the tyre monitoring device.

Optionally, the method comprises estimating the remaining service lifetime of the tyre monitoring device using the current value indicative of consumption of the power supply, and a previously determined value indicative of consumption of the power supply.

Optionally, the method comprises: comparing the estimated remaining service lifetime of the tyre monitoring device to a predetermined tyre replacement cycle for the tyre associated with the wheel on which the tyre monitoring device is installed; and the providing an indication is based on the comparing.

Optionally, the method comprises determining that the estimated remaining service lifetime of the tyre monitoring device expires between a scheduled time for a first tyre change and a scheduled time for a second tyre change of the predetermined tyre replacement cycle, wherein the indication indicates that the tyre monitoring device is to be replaced at the time of the first tyre change.

Optionally, the indication provides a warning about the status of the tyre monitoring device.

Optionally, the method comprises initiating action with respect to the tyre monitoring device responsive to the indication of status.

Optionally, determining the value indicative of consumption of the power supply comprises determining a mode of operation of the tyre monitoring device, assigning a consumption value dependent on the determined mode of operation, and modifying a previously determined value indicative of capacity of the power supply based on the consumption value Optionally, determining the value indicative of consumption of the power supply comprises determining a run-time of the mode of operation of the tyre monitoring device, assigning the consumption value based on the run-time, and modifying a previously determined value indicative of capacity of the power supply based on the consumption value.

Optionally, determining the value indicative of consumption of the power supply comprises directly measuring a value indicative of remaining power of the power supply, and modifying a previously determined value indicative of remaining power of the power supply based on the value indicative of remaining power of the power supply.

Optionally, determining the value indicative of consumption of the power supply comprises monitoring a flow of current out of the power supply, and modifying a previously determined value indicative of capacity of the power supply based on the monitored flow of current out of the power supply.

According to a second aspect of the invention there is provided a tyre monitoring device configured to be mounted on a wheel and comprising: a wireless communication interface; a power supply; and a processing system configured to execute the method of the first aspect of the invention.

Optionally, the indication comprises a message transmitted to another device using the wireless communication interface.

According to a third aspect of the invention there is provided a tyre monitoring system, comprising at least one tyre monitoring device and a processing system configured to execute the method of any one of claims 1 to 10 for the at least one tyre monitoring device.

BRIEF DESCRIPTION OF THE DRAWINGS

Embodiments of the invention will now be described, by way of example only, with reference to the accompanying drawings, in which.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Certain methods and systems described herein relate to the operation of a sensor network in an aircraft. In examples described herein, references to "aircraft" include all kinds of aircraft, such as fixed wing, for example military or commercial aircraft, or unmanned aerial vehicles (UAVs), and rotary wing aircraft, for example helicopters.

Example Tyre Monitoring System

Figure 1:
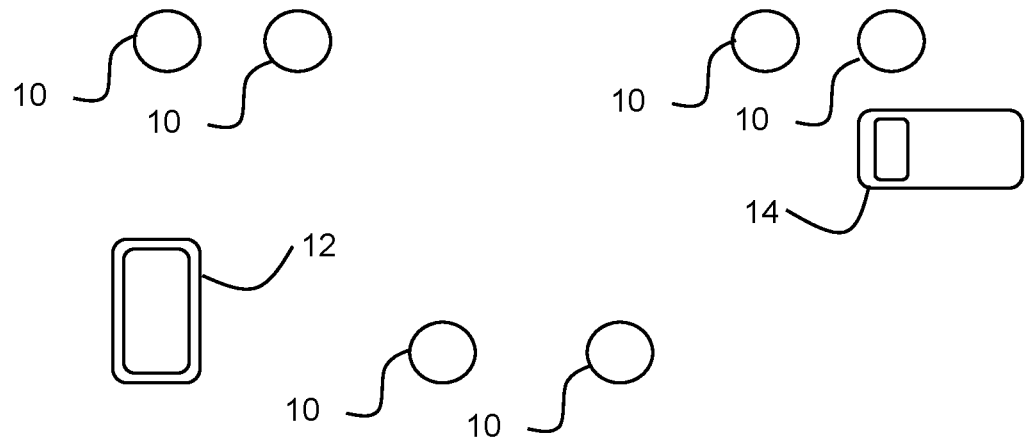
FIG. 1 shows a schematic representation of a tyre pressure sensor system according to a first example of the invention.

FIG. 1 shows a schematic representation of a tyre monitoring system, in this case a pressure sensor system according to a first example. The system comprises a plurality of tyre monitoring devices 10, a control device 12 and a configuration device 14, all of which are arranged to communicate via wireless communication. A tyre monitoring device is mounted on each wheel of a vehicle, in this case an aircraft (as explained in more detail below, with reference to FIG. 5). The control device 12 is separate from the tyre pressure sensors 10 and may be a dedicated control device which functions only in the tyre pressure sensor system, or a computing device which can also be used for other purposes than with the tyre pressure sensor system. Example computing devices include mobile devices such as laptops, tablets, cellular phones and wireless communication devices.

The wireless communications in the tyre pressure sensor system of FIG. 1 may use a local area network or a personal area network and can have any suitable topography, including centralized and mesh wireless systems. In centralized systems, a single device may be nominated as a master device to coordinate communications, or one or more additional wireless access points, gateways or controllers (not shown) may be used. In some examples, the tyre monitoring devices 10, control device 12 and configuration device 14 may all communicate using the same wireless technology and form a single network. In other examples one or more of the tyre monitoring devices 10, control device 12 and configuration device 14 may be separated from other elements of the system. Such separation may be provided in software, for example by providing a suitable firewall and/or the use of different network IDs and encryption keys. Such separation may also be provided by hardware, for example by different wireless communication technology. Both hardware and software separation may be combined. For example, in the system of FIG. 1, the control device communicates with the tyre sensing devices with a different wireless communication technology than the configuration, which may improve the security of the system.

Figure 2:
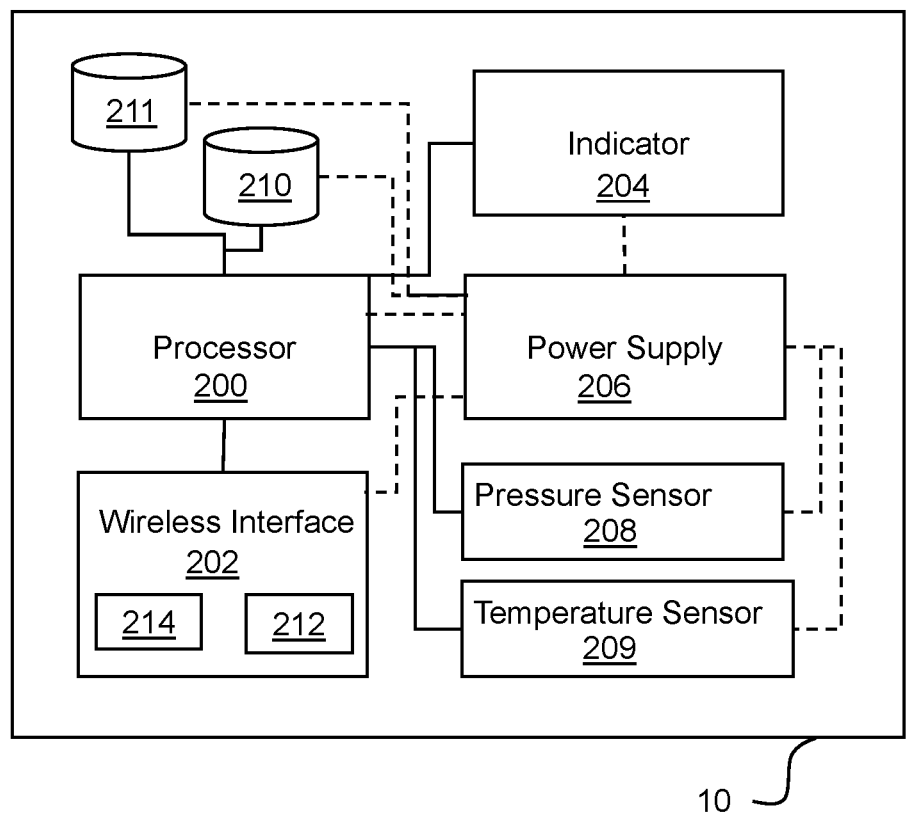
FIG. 2 shows a schematic representation of a tyre monitoring device for use in the example of FIG. 1.

FIG. 2 shows a schematic representation of a tyre monitoring device 10 for use in the tyre pressure sensor system of FIG. 1. The tyre monitoring device 10 is configured for mounting on a wheel, for example by a mechanical connection to an opening on the wheel providing access to the tyre.

The tyre monitoring device 10 includes a processor 200, a wireless communication interface 202, an indicator 204, a power supply 206, and a pressure sensor 208, a temperature sensor 209, a first storage 210 and a second storage 211.

Processor 200 may be any suitable processing device including a microprocessor with one or more processing cores. In use, processor 200 coordinates and controls the other components and may be operative to read and/or write computer program instructions and data from/to the storage 210, 211. The processor may be optimized for low power operation or have at least one processing core optimized for low power operation in some examples.

Wireless communication interface 202 is connected to the processor 200 and is used to both transmit and received data from the other devices of the tyre pressure sensor system. In this example, the wireless communication interface includes two transceivers, 212, 214 which both use different wireless technology. A first transceiver 212 is provided for relatively long-range communication, up to about 50 m or about 100 m. For example, the first transceiver may use a communication standard suitable for mobile devices, such as IEEE 802.15.1, IEEE 802.15.4, IEEE 802.11 (Wi-Fi) on either the 2.4 GHz or 5 GHz Industrial Scientific and Medical (ISM) bands or a Wireless Avionics Intra-Communications (WAIC) standard. The first transceiver also includes an encryption module for encrypting sent data and decrypting received data, for example according to the Advanced Encryption Standard (AES) utilizing pre-shared keys. A second transceiver 214 is provided for relatively short-range communications. For example, the second transceiver 214 may use a standard according to IEEE 802.15, such as IEEE 802.15.4, RFID or Near Field Communication (NFC). The second transceiver may operate over a range of less than 5 m, less than 3 m, less than 1 m, less than 50 cm, less than 25 cm, less than 10 cm, less than 5 cm, less than 1 cm or requiring contact between devices. Like the first transceiver 212, the second transceiver 214 also includes an encryption module for encrypting sent data and decrypting received data.

In some examples, a single wireless transceiver may be provided in the wireless communication interface. In that case the single transceiver may use relatively short range or relatively long range communication, or adjust the range (such as by controlling transmit power) as required.

Indicator 204 is connected to the processor 200 and controlled by the processor 200 to provide indications to a user of the tyre pressure sensor system. In this example the indicator is an LED, but in other examples the indicator is another form of light, a display, such as an LCD or e-ink display, or any other form of visual indication. In other examples, the indicator is an audible indicator, such as a buzzer, beeper, speaker or any other sound generating component. In further examples, the indicator can comprise both audible and visual indication components. The indicator provides at least first and second indications, for example a first colour and a second colour of emitted light. Further indications can also be provided, such as solid or flashing light. The tyre monitoring device has a housing (not shown) and the indicator 204 can provide an indication outside the housing, for example the LED may be mounted external to the housing or visible through the housing, or sound may be able to be emitted from within the housing.

The power supply 206 provides power to the elements of the sensing device. It may be a battery, such as Lithium battery. In this example, the power supply is a Lithium battery with power sufficient to run the sensor in normal operation for about 2 to 3 years. In other examples the power supply may comprise a power harvesting system, for example harvesting vibration and/or electromagnetic radiation to charge a capacitor or battery which is then used to power the device.

In use, the wireless sensing device may spend much of its operational life in "sleep" or low power mode, with most of the components other than the processor and wireless communication interface powered off. This can conserve battery life. For example, the tyre monitoring device may be by default in a low power mode, listening for a command to measure or report tyre pressure. As tyre pressure readings are likely to be required relatively rarely, perhaps as little as once every 10 days, once every 5 days, once every 3 days or once per day, this can provide useful power savings. In other examples, pressure may be sensed more frequently for example every 10 minutes, 15 minutes, 20 minutes, 30 minutes, 1 hour or 2 hours and stored for use in trend monitoring.

The pressure sensor 208 is connected to processor 200 and may be any suitable sensor for measuring pressure, for example a capacitive sensor. Similarly, the temperature sensor 209 is connected to processor 200 and may be any suitable sensor for measuring temperature, such as thermocouple. The temperature sensor 209 may be arranged to measure the temperature of the wheel or the temperature of the gas inside the tyre directly. Where the temperature sensor 209 measures the temperature of the wheel, this can be processed to determine the temperature of the gas in the tyre. For example, an algorithm or look-up table may be used.

The connection of the pressure sensor 208 and temperature sensor 209 to the processor 200 may be digital, providing a digital representation of the measured pressure and/or temperature from an Analogue to Digital Convertor (ADC) in the sensor itself, or analogue, in which case the processor may include an ADC to sample the received signal. Including both a pressure sensor and a temperature may be useful to determine a temperature compensated pressure value. Although this example includes a pressure sensor and a temperature sensor, other examples may include only a pressure sensor, or may include further sensors.

This example includes two storage elements 210 and 211. Storage 210 is non-volatile rewritable storage in this example, such as flash memory which can retain data without requiring applied power. Other examples may include volatile storage, which is kept powered by the power supply, or combinations of read-only and rewritable storage. Storage 210 is connected to the processor 200 and used to store both computer program instructions for execution by the processor and data, such as data from the pressure sensor 208 or received over the wireless communication interface 202. In some examples, storage 210 may store a history of pressure and/or temperature readings sensed by the pressure sensor 208 and the temperature sensor 209. For example, the previous ten days readings may be stored, with the newest data replacing the oldest once the storage is full.

Storage 211 is secure storage to which write and/or read access is restricted, for example only accessible to certain processes running on processor 200. Configuration data, such as wireless encryption keys can be stored in storage 211. In other examples, a single storage may be provided, or storage 210 and 211 may be provided in a single physical device with a logical partitioning between storage 210 and storage 211.

Figure 3:
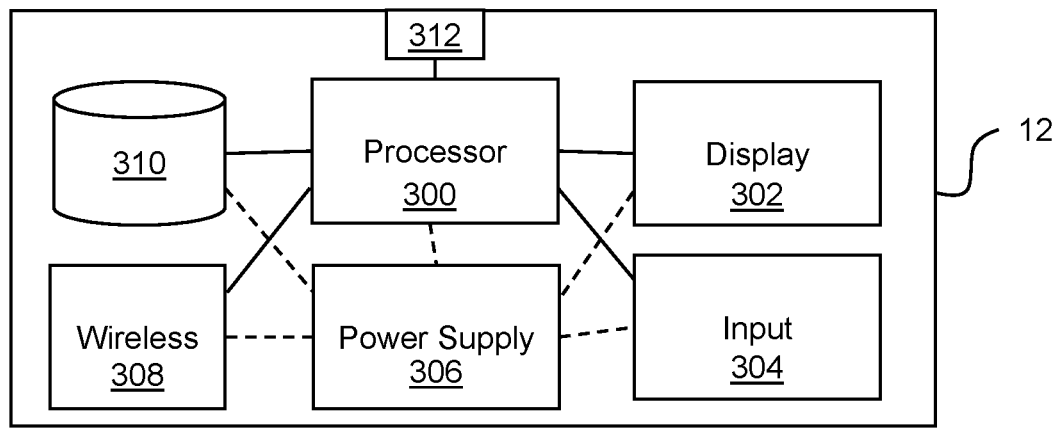
FIG. 3 shows a schematic representation of a control device for use in the example of FIG. 1.

FIG. 3 shows a schematic representation of a control device 12 for use in the example of FIG. 1. The control device 12 includes a processor 300, a display 302, an input system 304, a power supply 306, a wireless interface 308, a storage 310 and wired communication interface 312. In this example the control device is a mobile device, such as a cellular phone or a tablet computer.

The processor 300 is any suitable processing device, for example a multipurpose microprocessor, system-on-chip, or system in package, which may include one or more processing cores. Processor 300 is connected to the display 302, such an LCD, OLED or e-ink display to display information to a user of the control device.

Input system 304 includes a touch screen interface in this example, allowing a user to interact with the control device by touching user interface elements on the screen. The input system 304 may include one or more buttons in addition to the touch screen, as well as other input devices, such as a microphone for speech recognition and a camera for image input. Other examples may not include a touch screen interface.

The control device is powered by power supply 306, which is a rechargeable lithium-ion battery in this example. Other examples may use alternative power supplies, such as other battery technologies, mains power, or energy harvesting, such as solar power.

A wireless interface 308 is included for the control device 12 to communicate with other devices in the tyre pressure sensor system. In this example, a single wireless interface 308 is provided which is configured to communicate with the tyre monitoring devices 10. For example, a relatively long range wireless communication technology can be used, such as one conforming to IEEE 802.15.1, IEEE 802.15.4 or IEEE 802.11. This allows the control device 12 to interact with the tyre monitoring devices from a relatively long range.

In other examples, the control device may be provided with multiple wireless communication interfaces or transceivers, operating with different wireless technologies, such as at least two of IEEE 802.15.1, IEEE 802.15.4, IEEE 802.11 (Wi-Fi_33), WAIC, RFID and NFC. For example, the control device may have two transceivers with one having a longer communication range than the other.

Storage 310 includes a non-volatile element, such as flash memory, and a volatile element, such as RAM. The non-volatile element is used to store operating system software and application software. In this example, the control device runs standard operating system software and is loaded with application software to interact with the tyre pressure sensor system. In order to restrict access to the tyre pressure sensor network, the application software may be provided from a secure source and not available to the general public, and/or require credentials to be entered before operating.

Wired communication interface 312 is provided for connection to a computing system. The wired communication interface 312 can be for example, a serial data connection, such as Universal Serial Bus (USB), a parallel data connection or a network connection, such as Ethernet. The wired communication interface 312 may allow the control device to communicate values and/or other status information read from the tyre monitoring devices to the computing system, for example to store long term trends and assist fleet management. Alternatively, or additionally, wireless communication interface 308 may be used for communication with the computing system. In some examples, the control device may not include a wired communication interface.

Figure 4:
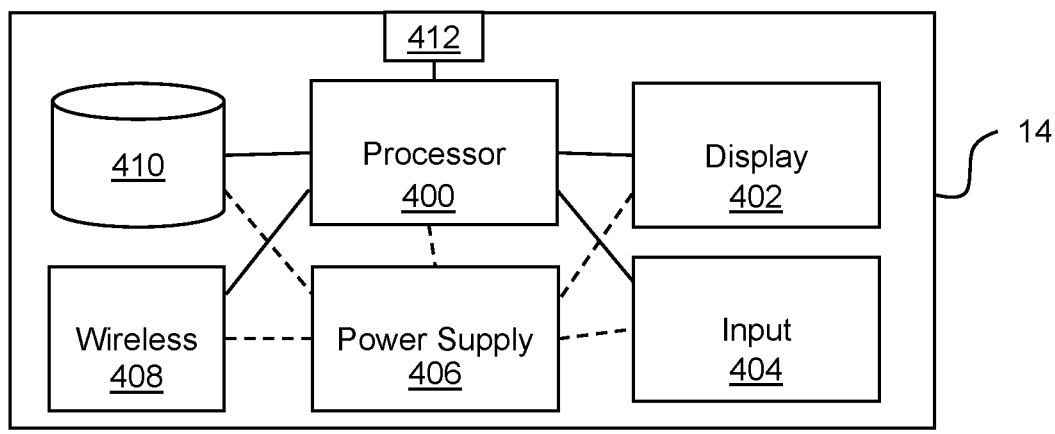
FIG. 4 shows a schematic representation of a configuration device for use in the example of FIG. 1.

FIG. 4 shows a schematic representation of a configuration device 14 for use in the example of FIG. 1. The configuration device 14 includes generally the same elements as the control device 12: a processor 400, display 402, input system 404, power supply 406, wireless interface 408, storage 410 and wired communication interface 412 and these are generally the same as described above for the control device, unless described otherwise below. In this example the configuration device is a mobile device but is restricted to operate only with the tyre monitoring system. For example, the configuration device may be a computing device or tablet which can only run software for interaction with the tyre monitoring system.

The wireless communication interface 408 of the configuration device in this example is a relatively short-range communication system, for example IEEE 802.15.1, IEEE 802.15.4, NFC or RFID. This allows the configuration device to act as an additional authentication factor when configuring the tyre monitoring devices, for example the tyre monitoring device may only respond to configuration commands received from the configuration device or may only respond to configuration commands received from the control device after a command received from the configuration device.

In other examples, the configuration device may include multiple wireless communication interfaces or transceivers. For example, the configuration device may include a transceiver for relatively short range communications as discussed above and a transceiver for relatively long-range communications, such as one conforming to IEEE 802.11.

The wired communication interface 412 of the configuration device may be used to provide information to the configuration device in a secure manner, for example enabling some encryption keys to be updated over a wired interface, such as a serial data connection, rather than a wireless interface.

In some examples, the configuration device 14 may be omitted and its place taken by the control device 12. The control device 12 may comprise a short range wireless communication interface, such as one conforming to IEEE, 802.15.1, IEEE 802.15.4, RFID or NFC. Application software may be loaded onto the control device to allow the control device to also function as an additional authentication factor, perhaps through the maintenance of cryptographic keys which can only be accessed with suitable credentials to control the operation of the short range wireless communication interface for the transmission of configuration commands In these examples, separate application software may be provided on the control device which can be executed to cause the control device to function as a configuration device.

Figure 5:
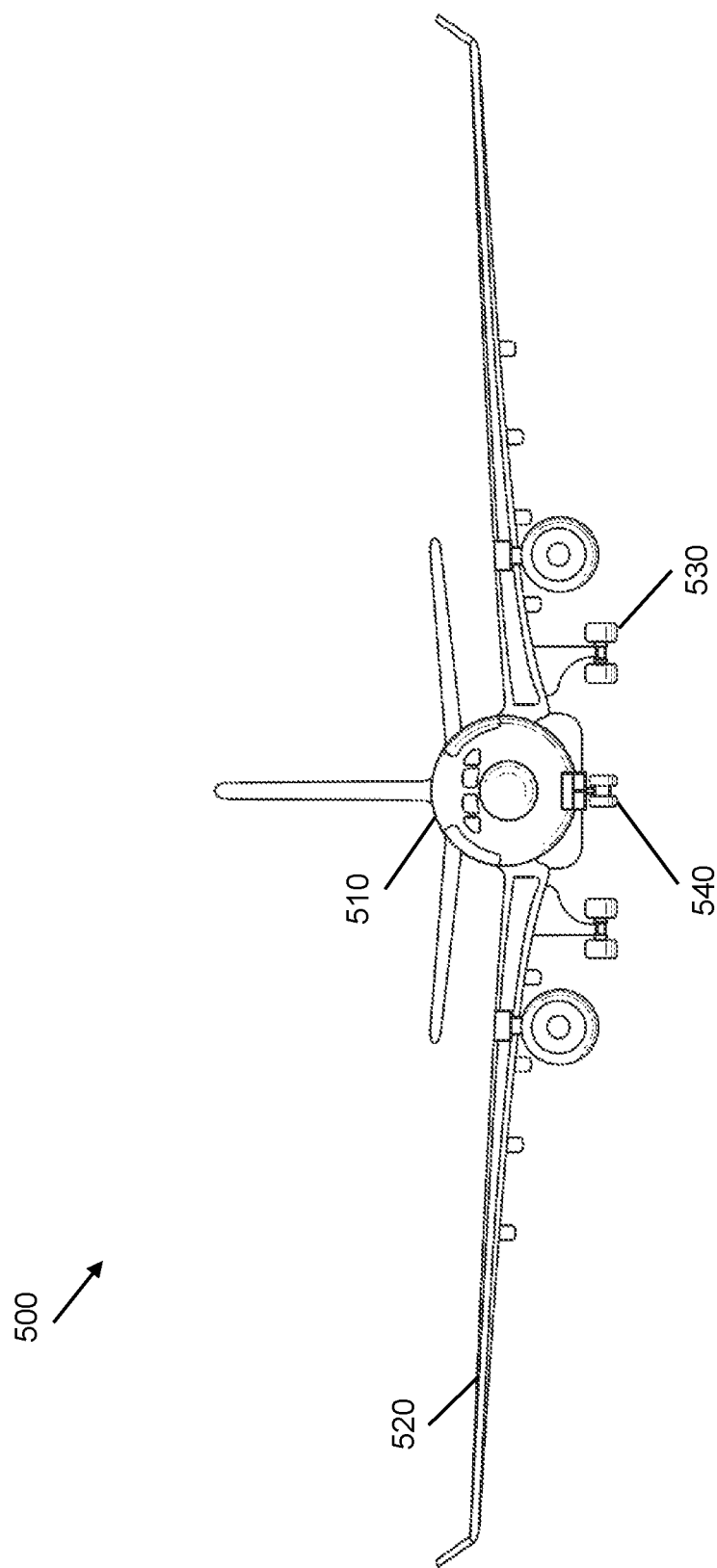
FIG. 5 shows a schematic representation of a tyre pressure sensor network installed in an aircraft.

FIG. 5 shows a schematic representation of a tyre pressure sensor network installed in an aircraft. The aircraft 500 comprises a fuselage 510, wings 520, main landing gear 530 and nose landing gear 540. According to an example, the aircraft 500 comprises a sensor network according to any of the examples described herein. The aircraft 500 may be used in conjunction with any of the methods described herein. According to an example, a plurality of wireless nodes are distributed at various locations around the aircraft 500. For example, in the landing gear 530, 540, the wings 520, and in the fuselage 510. Tyre monitoring devices are installed on each wheel of the main landing gear 530 and nose landing gear 540.

In an example, the tyre monitoring devices 10 are also in communication with a cockpit system to provide tyre pressure information to the pilots on the flight deck. In these examples, the flight deck console may also function as a control device.

Example Tyre Pressure check processes

Figure 6:
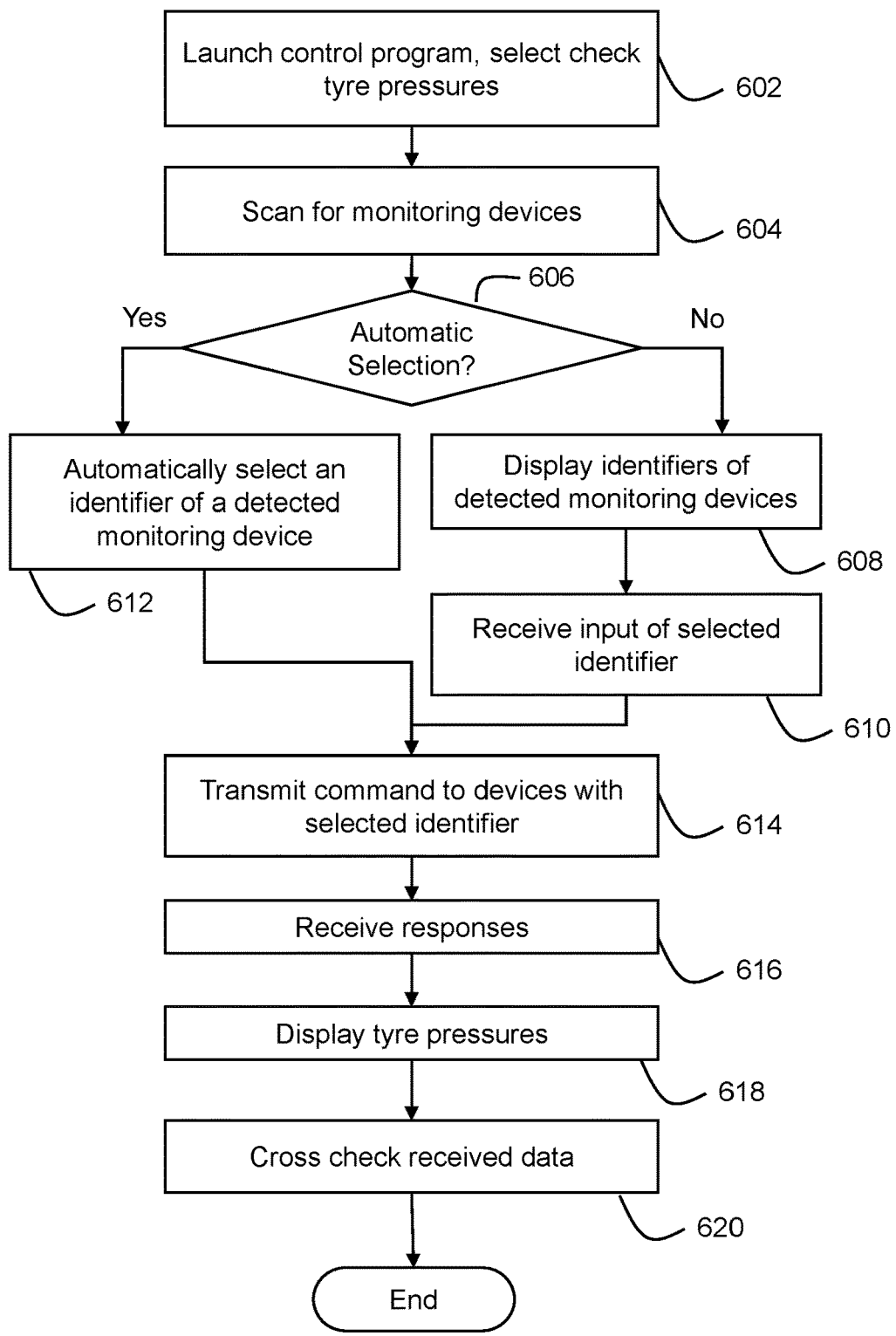
FIG. 6 shows a flow chart of a tyre pressure check process that can be used with the example of FIG. 1.

FIG. 6 shows a flow chart of a tyre pressure check process that can be used with the example of FIG. 1. First, at block 602, a user launches the tyre monitoring control application on the control device 12. During initialization of the application, a check is made that the wireless communication interface 308 for communication with the monitoring devices is active on the control device and the user is prompted to activate if it is not active.

Next, at block 604, the control device scans for tyre monitoring devices in range. For example, the control device may send out a probe over the wireless communication interface which causes any tyre monitoring devices in range to respond with an indication of their vehicle identifier, such as tail identifier of an aircraft to which the tyre monitoring device is attached. The scanning may comprise establishing direct, point-to-point contact with each tyre monitoring device, or contact through the network of tyre monitoring devices, for example through an access point, a master device, or any device in a mesh network. The scanning may comprise waking the tyre monitoring devices from a low power mode. The scanning may comprise using a secure network key to communicate with the sensor network.

Depending on the communication range and location, tyre monitoring devices associated with more than one vehicle may be detected. For example, several aircraft may be in the same hanger in range of the control device. Next, at block 606, it is determined whether an identifier should be selected automatically, without requiring using input. For example, the application may store a configuration option whether an identifier should be selected automatically or not. If automatic selection is not required, the process continues to block 608. If automatic selection is required, the process continues to block 612. In some examples, block 606 is not included. In these examples, the process can continue with either manual selection or automatic selection as explained below.

For manual selection, at block 608, the control device displays the identifiers of detected vehicles. At block 610, input is received of a selected identifier, for example from a user selection of the desired identifier.

For automatic selection, at block 612 a vehicle identifier is automatically selected from amongst the identifiers indicated in the received responses. This can be done in various ways. For example, when each tyre monitoring device in range responds individually to the control device, at least two responses may be from tyre monitoring devices associated with the same vehicle identifier. In that case, the vehicle identifier associated with the largest number of responses may selected automatically because that is likely to be the vehicle closest to the control device for which pressure measurement is required. In another example, the vehicle identifier of the tyre monitoring device closest to the control device may be selected, for example a response having a greatest Received Signal Strength Indication (RSSI). In a further example, all detected tyre monitoring devices may be associated with the same vehicle identifier, in which case that is selected.

Next, at block 614, a command is sent to the tyre monitoring devices corresponding to the selected identifier to cause them to read the pressures and report back to the control device, for example they may execute a process as described below with reference to FIG. 7.

Responses are received from the tyre monitoring devices at block 616 and displayed on the control device at block 618. The display of pressures may include one or both of a numerical value and a status indication such as "OK" or "Low Pressure".

At block 620 a cross check of the received data may be made to ensure data consistency. The process then ends.

Throughout the process of FIG. 6, communication between the control device and the sensor devices may be secure, for example encrypted by a network key. The network key for the communication with the control device may be different from the network key used for communication between the sensor devices to enhance the security of the system.

Security may be increased by using a wireless communication technology with a limited transmission distance when exchanging secure keys, for example 802.11 (Wi-Fi) standards may allow transmission over a distance of 50 m or further in clear space. In some examples, security may be increased by reducing transmission power, or using a low distance technology such as NFC/RFID, when encryption keys are transmitted compared to transmission of the encrypted data itself, requiring closer proximity for the initial key exchange process. Distance bounding techniques could also be introduced, which when combined with ultra-wide band radio communication, the distance of the communicating equipment can be securely measured, ensuring that the interaction is happening within a secure perimeter of the equipment FIG. 7 shows a flow chart of tyre pressure check process that can be used by the tyre monitoring device of FIG. 2. This process is provided to provide additional assurance and fault tolerance in the pressure measurements from the system, for example to guard against corrupt operation or errors in the control device. Through this process, the monitoring device uses its indicator to provide an indication of tyre pressure status independent of the control device. In some examples, the indication of tyre pressure status by the monitoring device may have a higher Development Assurance Level (DAL) than the indication provided on the control device. For example, although the control device may be used to initiate a tyre pressure measurement and provide a convenient means for a user to understand the results of the measurement it may not have DAL certification, while the operation of the monitoring device to provide the indication using the indicator on the monitoring device may be certified to Development Assurance Level B. This may allow the system to operate with a wide range of control devices, because certification of those devices to a DAL is not required, but still ensure that the system as a whole meets required safety standards. Similarly, in some examples the monitoring device may have a higher Security Assurance Level (SAL) than the control device.

First, at block 702, a tyre monitoring device receives a command to check pressures over the wireless communication interface from the control device. In response, at block 704, the processor uses the pressure sensor to measure the pressure in the tyre. The measured pressure is then compared against the reference pressure in block 706 to determine whether the tyre has low pressure. In this example low pressure occurs if the pressure sensed by the pressure sensor is less than 89% of the reference pressure. Other examples may determine a low pressure when the measured pressure is less than 95%, less than 90% or less than 85% of the reference pressure. Further examples may determine a low pressure when the measured pressure is at least about 207 kPa (about 30 psi) less than the reference pressure. Other examples may determine a low pressure when the measured pressure is at least about 138 kPa (about 20 psi), or about 69 kPa (about 10 psi) less than the reference pressure. If low pressure is detected, execution proceeds to block 708, otherwise execution proceeds to block 712.

At block 708, the processor uses the indicator to indicate a fault condition, for example by providing a solid red light for a predetermined period. The predetermined period may be 5 minutes, 2 minutes, 1 minute, or 30 seconds, for example. The processor also broadcasts a fault indication to the other tyre monitoring devices at block 712, again using the wireless communication interface.

At block 712, the processor checks to see whether any fault messages from other tyre monitoring devices have been received via the wireless communication interface. Such fault messages may be received directly, via other tyre monitoring devices or through a hub or access point. In this example, such fault messages are received without first being requested, following the receipt of the command in block 704. In other examples, the fault message may be received responsive to a status enquiry sent by the tyre monitoring device to the other tyre monitoring devices. If any fault messages are received, execution proceeds to block 714, where the processor uses the indicator to display a fault condition. For example, the fault indication may be the same as that used in block 708. In other examples, the fault indication may be different than that used in block 708, for example a second fault indication such as a flashing red light for a predetermined period. By using the second fault indication, the tyre monitoring device can indicate a fault in another tyre yet signal that its own measured pressure is not low.

If no fault messages are received at block 712, execution proceeds to block 716 where the processor uses the indicator to provide an "OK" indication. For example, by providing a solid green light for a predetermined period. The predetermined period may be 5 minutes, 2 minutes, 1 minute, or 30 seconds, for example. In this way, the "OK" indication is only given when all tyre monitoring devices have determined that the pressure of their associated tyre is not low and that they have not received an indication of a fault from another of the tyre monitoring devices.

Finally, at block 718, the data of the measured tyre pressure is transmitted to the control device in response to the command This data may include further information such as stored reference pressure, determined status, and wheel position. Transmission of additional information may allow verification of the correct operation of the tyre monitoring device and a check that the configuration data stored in the storage has not changed or has been set up correctly. The transmission in block 718 may be sent directly to a control device 12, to another tyre monitoring device 10 for onward routing, or to an access point or other wireless node.

Figure 7:
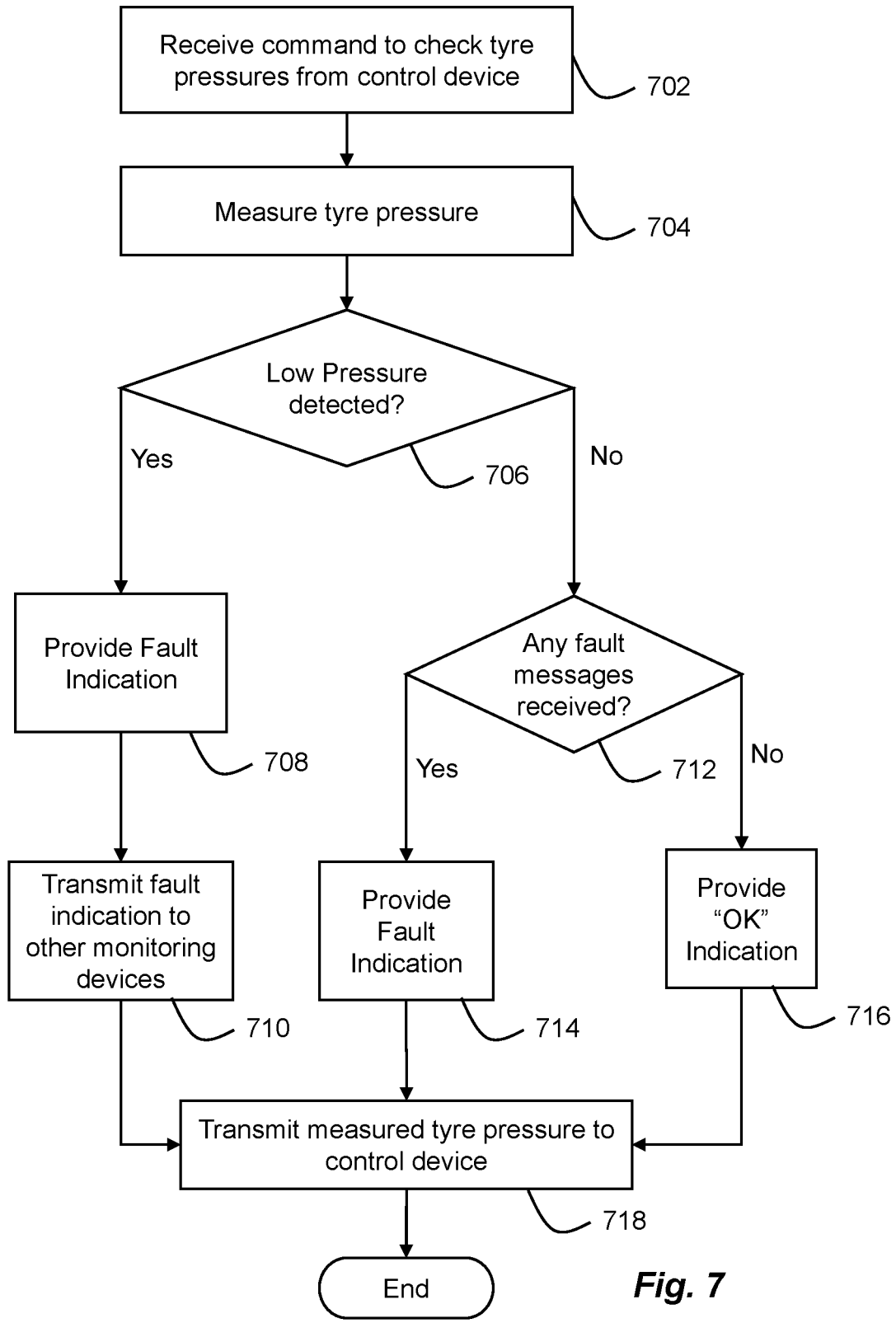
FIG. 7 shows a flow chart of tyre pressure check process that can be used by the tyre monitoring device of FIG. 2.

With the method of FIG. 7, confirmation of tyre pressure status is provided by the tyre monitoring devices themselves. A fault in any sensor causes all sensors to indicate a fault. In this way, the tyre monitoring devices may be certified according to a required DAL and/or SAL using the indication on the tyre monitoring devices themselves without requiring the control device to also be certified.

In other examples, rather than transmitting a fault indication at block 710, all tyre monitoring devices may instead transmit their measured pressure to other tyre monitoring devices. Received pressures may then be independently checked by each independent tyre monitoring device to determine whether faults exist. This may guard against a fault in a sensor which does not indicate a low pressure condition, for example if the stored reference pressure has become corrupted.

In further examples, the tyre monitoring device may transmit an "OK" status notification when it is determined that the tyre pressure is not low in block 706. Such examples may provide assurance that all sensors are operating correctly, because if no data is received from one of the other tyre monitoring devices it is indicative of a malfunction or fault in that tyre monitoring device.

Although the processes above describe the use of a general mobile device as a control device, the control device may also be a dedicated device provided only for use with the tyre monitoring system, or with the vehicle more generally. This may improve security as greater control is available.

Although the processes above describe the use of an indicator which is a light, other examples may use other indicators, such as displays and/or audio components. For example, rather than simply display a solid or flashing colour, a display may also display information of the measured pressure itself. Where audio and visual indicators are both provided, some indications may not use both the audio and visual indicator. For example, an "OK" indication may use only the visual indicator, with the audio indicator only activated on a fault.

Determining when to Replace a Tyre Monitoring Device

Figure 8:
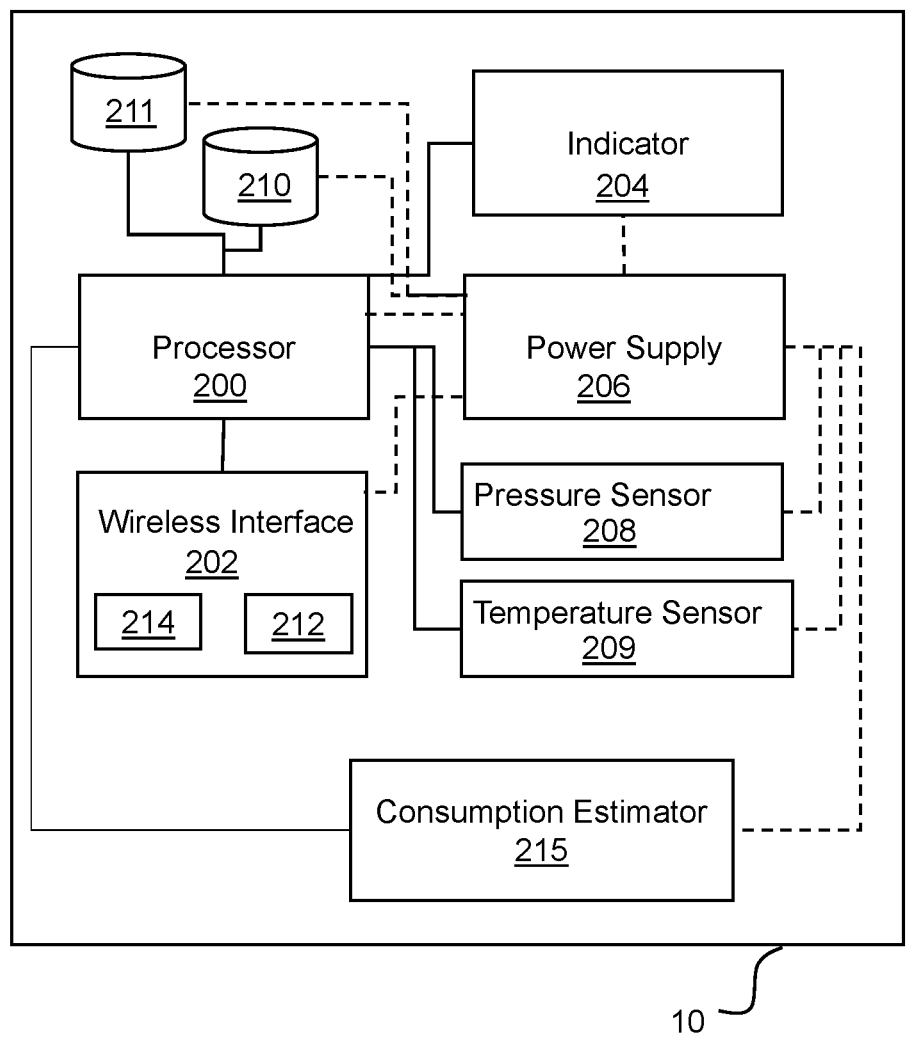
FIG. 8 shows a schematic representation of a tyre monitoring device for use in the example of FIG. 1.

FIG. 8 shows a schematic representation of a tyre monitoring device for use in the example of FIG. 1. The tyre monitoring device 10 of FIG. 8 is the same as that of FIG. 2 but with an additional component: a consumption estimator 215. The consumption estimator 215 may take many forms, and is coupled to the processor 200. The consumption estimator 215 is configured to determine a value indicative of consumption of the power supply 206 following activation of the tyre monitoring device 10. Although shown here as a separate component to the processor 200, it will be appreciated that in practice the consumption estimator 215 may form part of the processor 200.

In one example, the consumption estimator 215 determines a mode of operation of the tyre monitoring device 10, and assigns a consumption value dependent on the determined mode of operation. For example, different modes of operation of the device, such as stand-by, advertising, or measurement, may be known to consume different amounts of power from the power supply 206, and so the consumption estimator 215 assigns the consumption value based on the mode of operation of the tyre monitoring device 10. Here it will be appreciated that the precise consumption value per mode of operation may vary, but that, for example, a measuring mode of operation may comprise a greater consumption value than a stand-by mode of operation Using the obtained consumption value, the consumption estimator 215, or the processor 200, modifies a previously determined value indicative of capacity of the power supply 206 based on the consumption value. For example, at first turn-on of the tyre monitoring device 10, a capacity of the power supply may be determined to be 100%, each time the tyre monitoring device 10 operates in a new mode of operation the capacity of the power supply 206 decreases by a set amount, and a value corresponding to the consumption value, which is based on the specific mode of operation, may be cumulatively subtracted from the value indicative of capacity of the power supply 206. In another example, a value of 0% may be utilised at turn-on of the tyre monitoring device 10, with each consumption value determined being cumulatively added to the value of the capacity of the power supply 206 until the value of the capacity reaches a pre-determined threshold.

In another example, the consumption estimator 215 comprises a timer configured to time a mode of operation of the tyre monitoring device. The processor 200 obtains the time of the mode of operation, and converts the time and mode of operation to a consumption value based on pre-determined experimental or simulation data. For example, different modes of operation of the device, such as stand-by or measurement, may be known to consume different amounts of power from the power supply 206 when operated in that mode of operation for differing times. This may provide a more accurate consumption value than a consumption value based on mode of operation alone.

Other parameters, for example such as temperature, may also be taken into account when assigning a consumption value based on the mode of operation.

In one example, the consumption estimator 215 directly measures a value indicative of remaining power of the power supply 206, for example directly measures a remaining voltage value of the power supply 206, and modifies a previously determined value indicative of remaining power of the power supply 206 based on the value indicative of remaining power of the power supply 206. For example, at first turn-on of the tyre monitoring device 10 a capacity of the power supply 206 may be determined to be a certain value, and as capacity of the power supply 206 decreases, the value indicative of remaining power of the power supply 206 may be monitored and updated.

In another example, the consumption estimator 215 monitors a flow of current out of the power supply 206, and the consumption estimator 215 or processor 200 modifies a previously determined value indicative of capacity of the power supply 206 based on the monitored flow of current out of the power supply 206. For example, the consumption estimator 215 may perform coulomb counting, where the flow of current out of the power supply 206 is measured and integrated over time to provide an estimate of the state of charge of the power supply 206. In such an example the value indicative of consumption of the power supply may comprise a value indicative of state of charge of the power supply.

In one example, a first use of the tyre monitoring device corresponds to a point in time at which the tyre monitoring device enters a normal operation mode for use in service to monitor a tyre. Entry into the normal operation may be from a storage mode in which components other than the processor and wireless communication interface are powered off. Entry into the normal operation mode may occur on an initialisation of the tyre monitoring device, such as an initialisation prior to being used for the first time to monitor a tyre. Accordingly, the service life of the tyre monitoring device can be understood to be the period starting from the first use of the device and continuing through any subsequent periods of lower or intermittent power supply until the tyre monitoring device either stops working or is replaced.

The tyre monitoring device has a predetermined minimum service lifetime, for example the battery capacity may have an energy capacity sufficient to power the tyre monitoring device for at least three years and the service lifetime is at least three years. In other examples, such as those using energy harvesting such as vibration harvesting to charge a battery, the predetermined minimum service lifetime may be based on an expected minimum lifetime of the components in the tyre monitoring device, such as three years. Although three years is given as an example here, the predetermined minimum lifetime may be longer or shorter, such as one year, two years, four years or five years. The device is designed to be accurate during at least this predetermined service lifetime, however it may not remain accurate forever because of component wear due to the extreme environment the device is subjected to. Replacing the device at the end of its predetermined minimum service lifetime ensures that the device is not used beyond its capabilities.

The processor 200 of the tyre monitoring device 10, via the consumption estimator 215, determines a value indicative of consumption of the power supply 206. In some examples, this is responsive to an instruction from another device received via the wireless communication interface 202, such as a control device 12. Subsequently, the processor 200 either: transmits a first response to the another device using the wireless communication interface 202, the first response including the value indicative of consumption of the power supply 206 and causing the another device to determine a status of the tyre monitoring device 10 based on the value; and/or determines a status of the tyre monitoring device 10 based on the value indicative of consumption of the power supply 206 and transmits a second response to the another device using the wireless communication interface 202, the second response based on the status.

Each communication sent from the tyre monitoring device 10 to the control device 12 may include a value indicative of consumption of the power supply 206. In this way, any readings, such as sensed temperature or pressure, sent to the control device 12 are accompanied with a value, allowing an event log containing temperature and/or pressure history to be established for the device in question as readings are taken over time. In some examples a history of events, for example pressure and/or temperature readings may be transmitted from the tyre monitoring device to the control device 12 in addition to a current value indicative of consumption of the power supply 206.

In one example, any data received at the control device 12 from a tyre monitoring device 10, for example, the current value indicative of consumption of the power supply 206, may be sent from the control device 12 to another entity, such as a central management system, for processing. The central management system may then determine a status of the related tyre monitoring device. That is, a control device 12 may forward data received from tyre monitoring devices to a central management system for processing. Such a central management system can allow data for a fleet of vehicles, such as a fleet of aircraft to be monitored and analysed. For example, the central management system may be associated with an aircraft operator, such as an airline, an aircraft maintainer serving several airlines, or an aircraft manufacturer.

Figure 9:
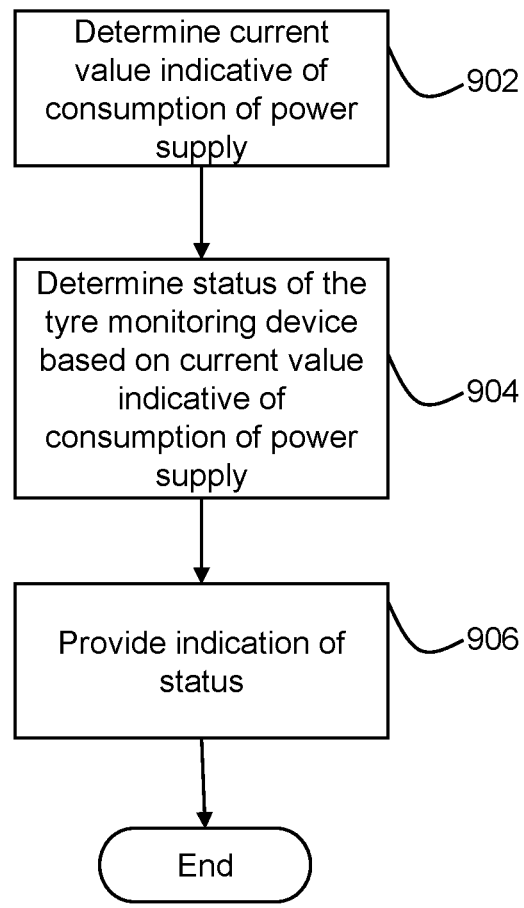
FIG. 9 is a flow chart of determining a remaining life of a tyre monitoring device.

FIG. 9 is a flow chart of determining a remaining life of a tyre monitoring device. The method of FIG. 9 may be carried out by a processor of the control device 12, a processor of the tyre monitoring device 10 or at another entity such as a central management system.

First, at block 902, a current value indicative of consumption of the power supply 206 is determined. This determination may be triggered by receipt of an instruction, such as an instruction from the control device 12, by completion of a reading by the tyre monitoring device, for example a pressure sensor reading or a temperature sensor reading, by reaching a pre-set time for performing a check, for example, as part of series of checks or a regular periodic measurement process, or by the tyre monitoring device 10 entering a new mode of operation.

Next, at block 904, a status of the tyre monitoring device 10 is determined based on the current value indicative of consumption of the power supply 206, where, in one example, the status may be indicative of a duration of elapsed service life of the device.

The status of the tyre monitoring device 10 may be at least one of:

(a) the unmodified value indicative of consumption of the power supply 206;

(b) an estimate of remaining service lifetime of the monitoring device 10 which may be usefully expressed in terms of hours, days or months, such as by calculating an average consumption over time and applying this to the remaining power supply capacity. For example, if the predetermined service lifetime is 3 years and the value indicative of consumption of the power supply 206 indicates an elapsed service life of two years with a consumption of two thirds, the remaining service life is 1 year, 12 months or 365 days;

(c) a categorisation of the status of the tyre monitoring device 10 in relation to an estimate of its total service lifetime, such a percentage lifetime remaining or lifetime used.

(d) an indication the tyre monitoring device 10 should be replaced based on the value indicative of consumption of the power supply 206, for example when the value indicative of consumption of the power supply 206 exceeds a predetermined threshold.

At block 906, the method comprises providing an indication or notification based on the status. An indication generated by the tyre monitoring device may be transmitted to the control device 12. An indication generated by the control device 12 may be transmitted to another device, such as a central management system or server, or transmitted internally within the control device 12, for example, from the processor 300 to the display 302 to cause a graphical representation of the indication to be presented to a user of the device 12. The indication may provide a warning of the status, for example a warning that replacement should be scheduled or that the end of the service life is approaching.

Action may be initiated in response to the indication. For example, when the method is carried out on a central management server, an instruction may be transmitted to cause replacement of the tyre monitoring device at a particular time in the future. The instruction may further cause replacement parts to be provided to a location where the replacement is scheduled to take place.

When the status is the estimated remaining service lifetime for a tyre monitoring device 10 may be compared to a predetermined tyre replacement cycle for the tyre associated with the wheel on which the tyre monitoring device 10 is installed. Based on this comparison, a point in time on the tyre replacement cycle at which the service lifetime of the tyre monitoring device 10 ends may be identified. The result of such identification may form the basis of a notification, for example the notification may comprise transmitting an instruction that causes replacement to be scheduled.

In addition, such comparison may result in a determination that the estimated remaining service lifetime of the tyre monitoring device 10 expires between a scheduled time for a first tyre change and a scheduled time for a second tyre change of the predetermined tyre replacement cycle. In such a scenario, it is determined that the tyre monitoring device 10 is to be replaced at the time of the first tyre change. In other words, a tyre monitoring device 10 may be scheduled to be changed at a tyre change scheduled to occur before the expiry of the service lifetime of the device 10, and, in particular, at a tyre change that is scheduled closest to and preceding said expiry. This ensures that the tyre monitoring device 10 remains operational, within its service lifetime, when fitted to the corresponding wheel. To give a numerical example, if the normal tyre replacement period is 60 days and the estimated remaining service lifetime is between 61 days and 120 days, replacement of the tyre monitoring device may be scheduled with the next tyre replacement in 60 days' time. In some examples, further considerations may impact replacement scheduling, for example knowledge of the expected location of the vehicle for future tyre changes. This can be useful where not all service locations have the same facilities.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A method of determining a status of a tire monitoring device installed on a wheel of an aircraft comprising a power supply, the method comprising:
   determining a value indicative of consumption of the power supply comprising:
      determining, from a plurality of possible modes of operations, a mode of operation of the tire monitoring device,
      assigning a consumption value based on the determined mode of operation,
      measuring and integrating a flow of current out of the power supply, and
      modifying a previously determined value indicative of capacity of the power supply based on the measured and integrated flow of current out of the power supply;
   determining an estimated remaining service lifetime of the tire monitoring device based on the value indicative of consumption of the power supply;
   comparing the estimated remaining service lifetime of the tire monitoring device to a predetermined tire replacement cycle for a tire associated with a wheel of an aircraft on which the tire monitoring device is installed;
   determining that the estimated remaining service lifetime of the tire monitoring device expires between a scheduled time for a first tire change and a scheduled time for a second tire change of the predetermined tire replacement cycle; and
   providing an indication that the tire monitoring device is to be replaced at the time of the first tire change.

2. The method of claim 1, further comprising estimating the remaining service lifetime of the tire monitoring device using a value indicative of consumption of the power supply at the current time, and a previously determined value indicative of consumption of the power supply.

3. The method of claim 1, wherein the indication provides a warning about the status of the tire monitoring device.

4. The method of claim 1, further comprising initiating action with respect to the tire monitoring device responsive to the indication of status.

5. The method of claim 1, wherein the determining the value indicative of consumption of the power supply further comprises directly measuring a value indicative of remaining power of the power supply, and the modifying the previously determined value indicative of the capacity of the power of the power supply is based on the value indicative of the remaining power of the power supply.

6. The method of claim 1, further comprising:
   in response to the indication, performing maintenance on a tire associated with the tire monitoring device.

7. The method of claim 1, wherein the tire monitoring device includes at least one sensor configured to sense a physical property associated with the wheel of the aircraft on which the tire monitoring device is installed.

8. The method of claim 7, the method further comprising:
   causing a message to be communicated between the tire monitoring device and at least one other computing device, the message based on the determined value indicative of consumption of the power supply and a value based on the physical property sensed by the at least one sensor.

9. The method of claim 7, wherein the at least one sensor includes a pressure sensor.

10. The method of claim 9, wherein the at least one sensor includes a temperature sensor.

11. The method of claim 7, wherein the determining of the value indicative of consumption of the power supply is further based on the sensed physical property associated with the wheel of the aircraft on which the tire monitoring device is installed.

12. The method of claim 7, further comprising:
   communicating, to the tire monitoring device and from another computing device, a request for a responsive message that is based on a sensor reading for the at least one sensor; and
   responsive to the request, communicating, from the tire monitoring device and to another computing device, the responsive message based on the sensor reading of the at least one sensor, wherein the responsive message is also based on the value indicative of consumption of the power supply of the tire monitoring device.

13. The method of claim 1, wherein the plurality of possible modes of operations different possible mode of operation includes: a stand-by mode, an advertising mode, normal operation mode, a storage mode, and/or a measurement mode.

14. The method of claim 1, wherein the consumption value is further based on a temperature parameter.

15. The method of claim 1, wherein the value indicative of consumption of the power supply is a value indicative of state of charge of the power supply.

16. The method of claim 1, further comprising
   receiving, at the tire monitoring device and from a control device, a request for data regarding the wheel that the tire monitoring device is configured to monitor; and
   in response to the request, wirelessly communicating, to the control device, a responsive message that includes the data and also includes the determined value that is indicative of consumption of the power supply.

17. The method of claim 16, wherein the data regarding the wheel is at least one of temperature and/or pressure and the determined value that is indicative of consumption of the power supply is automatically included in the responsive message.

18. A tire monitoring device configured to be mounted on a wheel of an aircraft, the tire monitoring device comprising:
   a wireless communication interface;
   a power supply; and
   a processing system configured to:
      determine a value indicative of consumption of the power supply comprising:

determining, from a plurality of possible modes of operations, a mode of operation of the fire monitoring device, assigning a consumption value based on the determined mode of operation, measuring and integrating a flow of current out of the power supply, and modifying a previously determined value indicative of capacity of the power supply based on the measured and integrated flow of current out of the power supply;

determine an estimated remaining service lifetime of the tire monitoring device based on the value indicative of consumption of the power supply; and provide an indication based on the estimated remaining service lifetime, the indication comprising a message transmitted to another device using the wireless communication interface, the message for use by the another device to determine when to replace the tire monitoring device.

19. A tire monitoring system, comprising:

at least one tire monitoring device installed on a wheel of an aircraft; and a processing system configured to:

determine a value indicative of consumption of a power supply comprising:

determine, from a plurality of possible modes of operations, a mode of operation of the tire monitoring device; and assign a consumption value based on the determined mode of operation, measuring and integrating a flow of current out of the power supply, and modifying a previously determined value indicative of capacity of the power supply based on the measured and integrated flow of current out of the power supply;

determine an estimated remaining service lifetime of the tire monitoring device based on the value indicative of consumption of the power supply;

provide an indication based on the estimated remaining service lifetime; and in response to the indication causing replacement of the tire monitoring device at a particular future time.

20. The method of claim 19, wherein the value indicative of consumption of the power supply is a value indicative of state of charge of the power supply.

\* \* \* \* \*